United States Patent
Orban et al.

(10) Patent No.: US 10,351,363 B2
(45) Date of Patent: Jul. 16, 2019

(54) MUD CHEMICAL DELIVERY SYSTEM AND METHOD

(71) Applicant: Schlumberger Technology Corporation, Sugar Land, TX (US)

(72) Inventors: Jacques Orban, Katy, TX (US); Brian Rogers, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 90 days.

(21) Appl. No.: 15/085,353

(22) Filed: Mar. 30, 2016

(65) Prior Publication Data
US 2016/0289012 A1    Oct. 6, 2016

Related U.S. Application Data

(60) Provisional application No. 62/140,902, filed on Mar. 31, 2015.

(51) Int. Cl.
   *B65G 65/42*     (2006.01)

(52) U.S. Cl.
   CPC .................. *B65G 65/425* (2013.01)

(58) Field of Classification Search
   CPC ........ B65G 53/16; B65G 53/22; B65G 65/42; B65G 65/425; B65D 2519/00805
   USPC ....... 406/123, 127, 128, 129, 130, 131, 132, 406/133, 144; 222/135; 414/414
   See application file for complete search history.

(56) References Cited

U.S. PATENT DOCUMENTS

| | | | | |
|---|---|---|---|---|
| 1,674,391 A | * | 6/1928 | Dunnagan | A01M 9/0092 222/317 |
| 2,522,203 A | * | 9/1950 | Williams | F23K 3/00 110/105 |
| 2,639,050 A | * | 5/1953 | Hoffmann, Jr. | B65D 19/0095 108/52.1 |
| 3,344,831 A | * | 10/1967 | Brackett | B65D 19/12 206/386 |
| 3,753,407 A | * | 8/1973 | Tilseth | B65D 19/44 108/53.3 |
| 4,397,406 A | * | 8/1983 | Croley | B65D 5/726 222/105 |
| 4,489,825 A | * | 12/1984 | Gladish | B65G 15/40 104/23.2 |

(Continued)

FOREIGN PATENT DOCUMENTS

| | | |
|---|---|---|
| JP | 11-214772 A | 8/1999 |
| WO | WO2016167747 A1 | 10/2016 |

OTHER PUBLICATIONS

International Preliminary Report on Patentability issued in the related PCT Application PCT/US2016/025148, dated Oct. 3, 2017 (8 pages).

*Primary Examiner* — Joseph A Dillon, Jr.
(74) *Attorney, Agent, or Firm* — Rachel Greene

(57) ABSTRACT

A silo, a chemical delivery system, and a method. The silo includes a housing and a vessel positioned within the housing and configured to contain a mud chemical. The vessel includes a discharge port and a discharge valve that controls discharge of the mud chemical through the discharge port. The discharge port is configured to connect to a skid by placing the silo on the skid, and the silo has a plurality of configurations for different types of mud chemicals.

15 Claims, 14 Drawing Sheets

(56) References Cited

U.S. PATENT DOCUMENTS

| | | | |
|---|---|---|---|
| 4,592,679 A * | 6/1986 | Boiting | B65G 53/66 406/127 |
| 4,705,433 A * | 11/1987 | Brannstrom | B65G 53/4616 406/127 |
| 4,850,751 A * | 7/1989 | Federhen | B65G 53/4691 406/127 |
| 5,271,439 A * | 12/1993 | Alack | B65G 53/22 141/65 |
| 5,775,803 A | 7/1998 | Montgomery et al. | |
| 5,845,799 A * | 12/1998 | Deaton | B65D 19/18 220/1.5 |
| 6,089,795 A * | 7/2000 | Booth | B60P 1/60 209/133 |
| 6,213,227 B1 * | 4/2001 | Dietzen | B63B 27/20 175/206 |
| 6,213,307 B1 * | 4/2001 | Stein | B07B 4/02 209/134 |
| 6,231,284 B1 * | 5/2001 | Kordel | B65D 19/44 108/55.3 |
| 6,749,330 B2 | 6/2004 | Allen | |
| 6,925,392 B2 | 8/2005 | McNeil, III et al. | |
| 6,968,946 B2 * | 11/2005 | Shuert | B65D 19/0028 206/386 |
| 6,988,568 B2 * | 1/2006 | Buckner | E02F 3/8816 175/67 |
| 7,044,239 B2 | 5/2006 | Pinckard et al. | |
| 7,325,629 B2 * | 2/2008 | Blaschke | E21B 21/066 175/205 |
| 7,823,656 B1 | 11/2010 | Williams | |
| 8,201,628 B2 | 6/2012 | Lovorn et al. | |
| 8,261,826 B2 | 9/2012 | Lovorn et al. | |
| 8,281,875 B2 | 10/2012 | Lovorn et al. | |
| 8,347,957 B2 | 1/2013 | Stephenson et al. | |
| 8,397,836 B2 | 3/2013 | Pool et al. | |
| 8,812,236 B1 | 8/2014 | Freeman et al. | |
| 9,022,707 B2 * | 5/2015 | Ness | B65D 19/02 410/32 |
| 9,475,528 B2 * | 10/2016 | Picard | B60P 1/60 |
| 9,650,206 B2 * | 5/2017 | Steele | B65D 88/703 |
| 2002/0130129 A1 * | 9/2002 | Chevillotte | B65D 19/06 220/495 |
| 2002/0148859 A1 * | 10/2002 | Pigott | B65D 11/10 222/185.1 |
| 2004/0118725 A1 * | 6/2004 | Shuert | B65D 19/0028 206/386 |
| 2005/0133514 A1 * | 6/2005 | Schutz | B65D 19/10 220/630 |
| 2006/0131078 A1 * | 6/2006 | Browne | B01F 3/1207 175/74 |
| 2007/0051539 A1 * | 3/2007 | Blaschke | E21B 21/066 175/66 |
| 2007/0295822 A1 * | 12/2007 | Kawai | B65D 19/0012 235/492 |
| 2008/0196942 A1 * | 8/2008 | Bingham | E21B 21/01 175/46 |
| 2008/0210467 A1 | 9/2008 | Eia | |
| 2008/0314297 A1 * | 12/2008 | Macqueen | A47F 5/10 108/48 |
| 2010/0319921 A1 | 12/2010 | Eia et al. | |
| 2011/0120589 A1 | 5/2011 | Evans | |
| 2013/0213830 A1 * | 8/2013 | Schurrie | B65D 81/00 206/216 |
| 2014/0030031 A1 * | 1/2014 | Stevenson | B01F 3/18 406/127 |
| 2014/0110425 A1 | 4/2014 | Pahl et al. | |
| 2014/0234034 A1 * | 8/2014 | Shimono | F23K 3/02 406/127 |
| 2014/0299377 A1 | 10/2014 | Abbassian et al. | |
| 2014/0309936 A1 | 10/2014 | Abbassian et al. | |
| 2015/0099231 A1 * | 4/2015 | Long | E21B 41/0071 431/5 |
| 2016/0076321 A1 * | 3/2016 | Hurst | E21B 21/066 175/57 |
| 2016/0083177 A9 * | 3/2016 | Oren | B65G 69/181 414/411 |
| 2016/0130033 A1 * | 5/2016 | Hess | B65G 1/00 108/12 |
| 2017/0190523 A1 * | 7/2017 | Oren | B65G 15/00 |

\* cited by examiner

MUD CHEMICAL DELIVERY SYSTEM AND METHOD

CROSS-REFERENCE TO RELATED APPLICATIONS

This application claims priority to U.S. Provisional Patent Application having Ser. No. 62/140,902, which was filed on Mar. 31, 2015, and is incorporated herein by reference in its entirety.

BACKGROUND

For oil and gas drilling application, various products and additives ("chemicals") may be added to drilling mud pumped into the wellbore. Bentonite and barite, for example, may be added to the mud to control gelling and density. Further, chemical additives may be mixed with the mud to control fluid rheology, filter cake creation, reactivity, dissolution of salt formations, etc. Lost-circulation material (LCM) may be added to manage loss of fluid in formation via fracture and large porosity. Well-strengthening material (WSM) may also be added. WSM generally includes a mix of crushed hard materiel which can be forced into a fracture to plug the fracture to prohibit additional movement of the fracture and reduce fluid loss into the fracture. Inert materials may be added to reduce wellbore friction and drag.

Such chemicals can be provided either in solid form or in liquid form. Solid chemicals can be powder or coarse products. Powder may be transferred by pneumatic conveyance; however, coarse product (such as crushed carbonate) may be difficult to transfer by pneumatic conveyance.

In some oil and gas applications, these products may be delivered to the drilling rigs in paper sacks, e.g., of about 20-25 kilograms (e.g., about 50 pounds). On location, rig workers may manually handle these sacks, cut them, and drop their content into a mud mixer. Liquid chemicals may be delivered in barrels or in gallon containers. When delivered in a barrel, a transfer pump may be used to transfer the liquid additives into the existing mud. When delivered in gallon containers, the liquid additives may be manually poured into the mud.

SUMMARY

Embodiments of the present disclosure may provide a silo for a chemical delivery. The silo includes a housing and a vessel positioned within the housing and configured to contain a mud chemical. The vessel includes a discharge port and a discharge valve that controls discharge of the mud chemical through the discharge port. The discharge port is configured to connect to a skid by placing the silo on the skid, and wherein the silo has a plurality of configurations for different types of mud chemicals.

Embodiments of the disclosure may also provide a chemical delivery system for a drilling rig. The system includes a silo that includes a housing and a vessel positioned within the housing and containing a mud chemical. The vessel includes a discharge port and a discharge valve configured to control discharge of the mud chemical through the discharge port. The silo has a plurality of configurations for different types of mud chemicals. The system also includes a skid. The skid includes a base onto which the silo is received and a discharge path. The discharge path includes a powder discharge conduit configured to receive a powdered chemical from the discharge port when the silo is in a first configuration of the plurality of configurations, a conveyor configured to receive a coarse chemical from the discharge port when the silo is in a second configuration of the plurality of configurations, and a liquid discharge conduit configured to receive a liquid chemical from the discharge port when the silo is in a third configuration of the plurality of configurations.

Embodiments of the present disclosure may also provide a method for delivering a chemical to a drilling rig. The method includes lowering a silo onto a base of a skid, opening a discharge port of the silo using an actuator of the skid, selecting a discharge path for a mud chemical contained within the silo based on a type of the mud chemical, delivering the mud chemical from the discharge port into the discharge path of the skid, and directing the mud chemical from the discharge path to a mud mixing system and a drilling rig.

The foregoing summary is not intended to be exhaustive, but is provided merely to introduce a subset of the aspects of the present disclosure. These and other aspects are presented in greater detail below.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
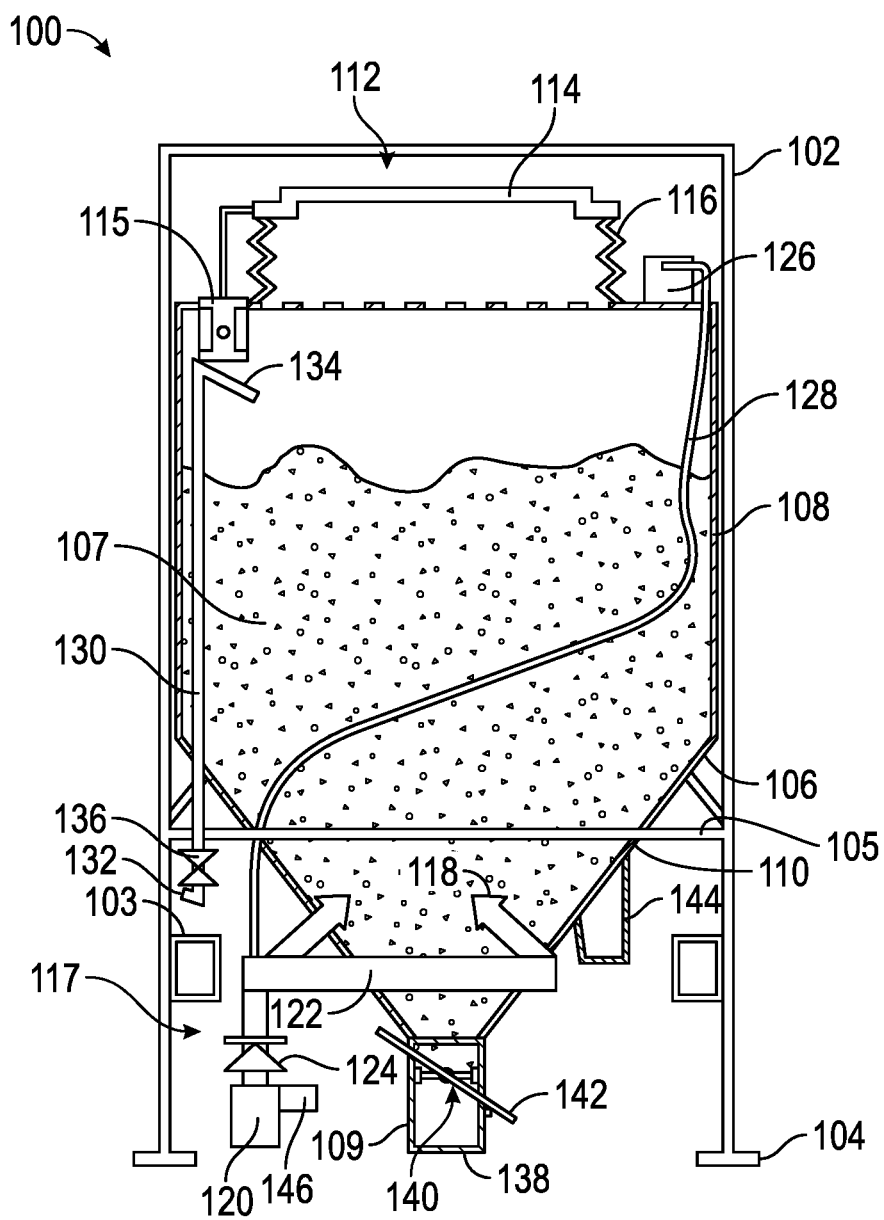
FIG. 1 illustrates a side, schematic view of a chemical silo in a first configuration, according to an embodiment.

In general, a chemical delivery system is provided according to embodiments disclosed herein. The chemical delivery system may be tailored for use in a drilling rig system, especially for adjusting the chemical composition of drilling mud. The chemical delivery system may include a skid and one or more chemical silos. The chemical silos may contain powdered chemical, coarse chemical, or liquid chemical. The skid may interact with the silos as the silos are lowered onto the skid. For example, the skid may provide air to the silo, open a discharge valve of the silo, provide for mechanical agitation of the chemical within the silo, etc. Further, the skid may open discharge valves of the silos and may control a feed rate of the chemicals from each of the silos, e.g., based on commands from a controller. The skid may also include a reading device that may read an identifier of each of the silos. The identifier may convey information about the chemical to the controller. The controller, in turn, may employ this information to configure the skid to receive the chemical within each silo in the appropriate part of the discharge path.

Reference will now be made in detail to specific embodiments illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object or step, and, similarly, a second object could be termed a first object or step, without departing from the scope of the present disclosure.

The terminology used in the description of the invention herein is for the purpose of describing particular embodiments only and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

FIG. 1 illustrates a side, schematic view of a chemical silo 100 in a first configuration, according to an embodiment. The chemical silo 100 may include a housing 102, which may be or include a frame, a partially enclosed structure, or a fully enclosed structure. In an embodiment, the housing 102 may be formed as a rectangular prism, such that it is square as viewed from above. In other embodiments, other cross-sections may be employed; however, the square cross-section may facilitate loading of several such silos 100 onto a single skid, pallet, bed, etc. for transport and in use, as will be described below. Further, the housing 102 may include grips 103, which may be configured to receive arms of a forklift, a crane, etc., for transport.

In addition, the housing 102 may have a bottom that is at least partially open, as shown, and may provide feet 104, upon which the silo 100 may be supported. In some embodiments, the bottom of the housing 102 may allow the passage of a relatively small hole and/or a conduit, for dispensing of the contents from within the silo 100 via gravity feed, for example.

Within the housing 102, the silo 100 may include a chemical vessel 106, in which a mud chemical of one (or more) types may be contained. In a first configuration of the silo 100, the vessel 106 may contain a powdered chemical 107. Powdered chemical may generally be chemicals having a mean particle size of less than about 100 microns, for example. Specific examples of powdered chemicals include powder such bentonite, starch, polymer. The vessel 106 may be supported by the housing 102 and coupled thereto via supports 105, which may be or include struts, ribs, connectors, fasteners, weldments, etc. that may rigidly or flexibly support the chemical vessel 106 in the housing 102. The vessel 106 may have an upper portion 108 that is a cube or a rectangular prism, e.g., similar to the contour of the housing 102, and may have a lower portion 110 that is a triangular prism, cone, or the like, forming a funnel that tends to direct the contents of the vessel 106 toward a vessel outlet 109 formed at the bottom of the vessel 106.

The vessel 106 may be configured to be held at a generally constant pressure, e.g., substantially equal to the ambient atmospheric pressure, which may allow for the use of thin, light-weight walls in the vessel 106. However, the silo 100 may be subjected to temperature fluctuations, e.g., in the ambient environment, which may cause expansion of air or gasses within the vessel 106. To avoid breathing of air in and out of the chemical vessel 106 due to temperature variation, the vessel 106 is may be sealed. This may avoid allowing humidity to be brought into contact with the chemical in the vessel 106.

Accordingly, the chemical vessel 106 may have an expansion system 112, which may incorporate a deformable structure such as a flat surface 114 attached to the vessel 106 by a deformable bellows 116. The flat surface 114 may incorporate the lid of the vessel 106, for example. Thus, the expansion system 112 may be configured to adjust an interior volume of the vessel 106, which may allow the expansion of the gas (air) inside the chemical vessel 106, and in turn reduce fluctuations in the internal pressure. In other embodiments, rather than or in addition to the bellows 116, the flat surface 114 may be configured to deflect, stretch, or otherwise move in order to increase the internal volume of the vessel 106. In some embodiments, the flat surface 114 may be integral with the upper portion 108. The silo 100 may also include a balancing valve 115, which may be a poppet valve or another type of valve configured to open to relieve pressure within the vessel 106, e.g., if gas expansion exceeds the abilities of the expansion system 112.

The silo 100 may also include an air supply system 117. The air supply system 117 may be provided for "fluidification" of the powered chemical 107 within the chemical vessel 106, which may facilitate evacuation of the powdered chemical 107 through the vessel outlet 109. The air supply system may include one or more air supply nozzles 118, which may deliver air (or any other gas) into the chemical vessel 106, e.g., in the lower portion 110 thereof. The air supply system 117 may also include a stabbable air connection 120, which may be connected to the air supply nozzles 118 via a header 122 or another type of conduit. A check valve 124 may be positioned between the nozzles 118 and the air connection 120.

Air that is supplied via the air supply system 117 to the interior of the vessel 106 may be released from the interior of the vessel 106, e.g., via an air escape valve 126. The air escape valve 126 may be opened in response to air being received into the air connection 120, into the header 122, and/or through the nozzles 118. In some embodiments, pressure sensors, processors, etc. may be employed to detect such air flow and/or a heightened pressure within the interior of the vessel 106, and the air escape valve 126 may be modulated in response. In the illustrated embodiment, however, a pneumatic control line 128 extends from the header 122 (or any other part of the air supply system 117) to the air escape valve 126. The air escape valve 126 may include a diaphragm which may be responsive to air pressure or flow in the control line 128, and may open when such air flow is received therethrough. Accordingly, the air escape valve 126 may be automatically opened in response to air being injected via the air supply system 117.

The silo 100 may also include a fill conduit 130, which may extend from the interior of the vessel 106 to an exterior thereof. A fill inlet 132 may be provided at one end of the fill conduit 130, and a fill outlet 134 may be provided at the other, with the inlet 132 generally being exterior to the vessel 106, and the outlet 134 being therein. A fill valve 136 may also be provided, e.g., proximal to the inlet 132, and may be opened to allow chemicals to be fed therethrough and closed to seal the fill conduit 130. The fill outlet 134 may be positioned in the upper portion 108 of the vessel 106, so as to allow the chemical 107 to be deposited into the vessel 106 regions therebelow. In other embodiments, however, the fill outlet 134 may be placed elsewhere within the vessel 106.

The inlet 132 may be coupled to a source of the chemical 107, which may deliver the chemical 107 via the fill conduit 130, through the outlet 134 and into the interior of the vessel 106. During filling, the escape valve 126 may have to be open. When the filling operation is complete, the fill valve 136 may be closed.

The vessel outlet 109 may be positioned at the bottom of the vessel 106, e.g., at a narrowest point of the tapered lower portion 110, such that the chemical 107 is channeled thereto by gravity, e.g., with assistance (fluidification) from the air received via the air supply system 117. The vessel outlet 109 may include a discharge port 138, through which chemical 107 released from the vessel 106 may proceed. The release of the chemical 107 may be controlled via a discharge valve 140, which may be, for example, a "butterfly" valve, although many other types of valves (e.g., gate valves, ball valves, etc.) may be employed. In the illustrated embodiment, the discharge valve 140 includes a handle 142, which may be rotated to open and close the valve 140.

Further, the silo 100 may include a stirrer port 144 for receiving a mechanical stirrer (not visible in FIG. 1) for further facilitating mobility of the chemical 107. In addition, the silo 100 may include an identifier 146, which may be capable of transmitting data to a reader, with the data providing, or providing a key for access to, information about the chemical 107 within the silo 100 (e.g., composition, safety, serial number, volume, mass, etc.). The identifier 146 may be or include a radiofrequency identification tag or reader, a bar code, a memory circuit, a microprocessor, or the like.

Figure 2:
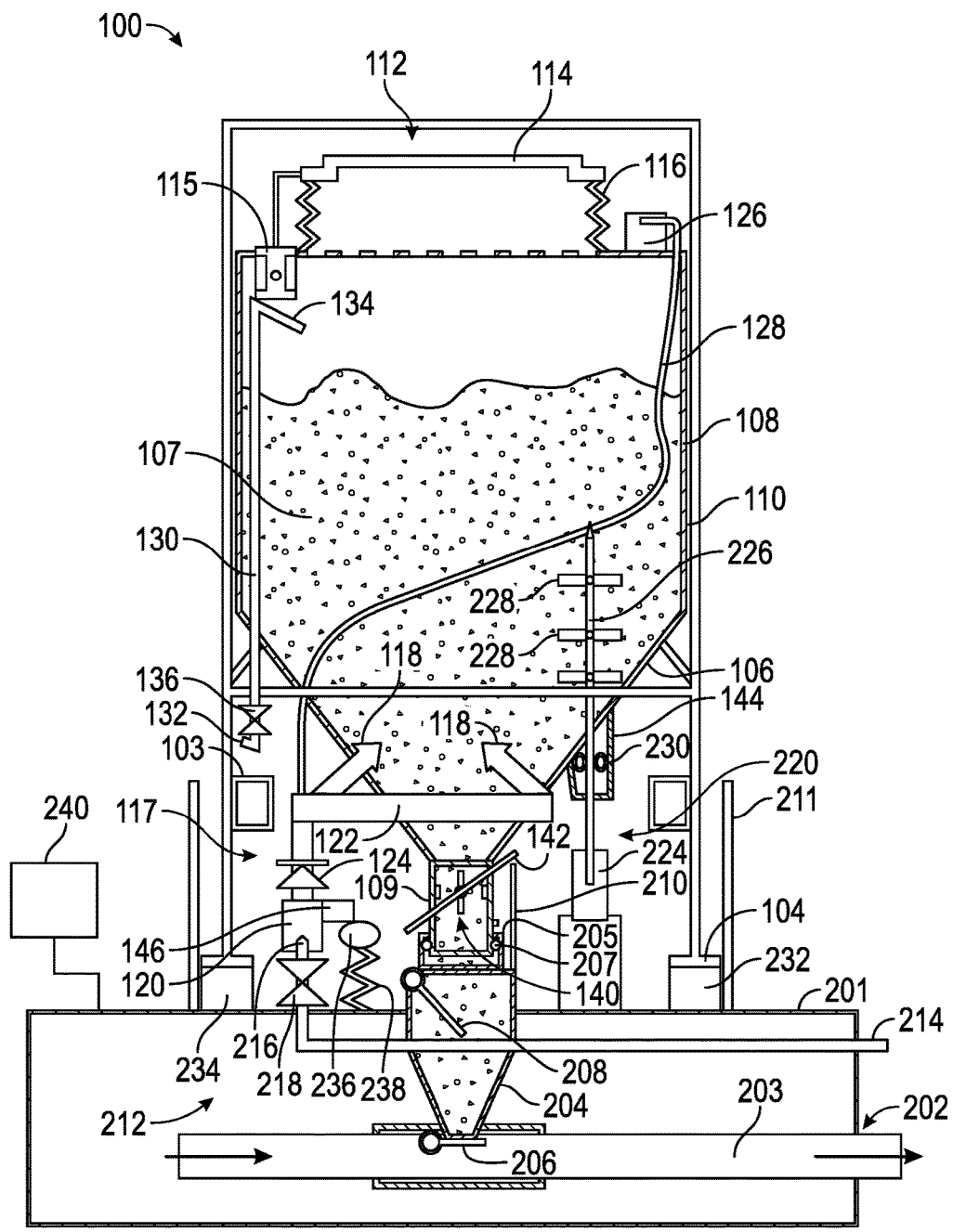
FIG. 2 illustrates a schematic view of the silo in the first configuration received onto a skid, according to an embodiment.

With continuing reference to FIG. 1, FIG. 2 illustrates a schematic view of the silo 100 in the first configuration and received onto a skid 200, according to an embodiment. The silo 100 may be placed (e.g., lowered) vertically onto the skid 200. The skid 200 may interact with the components of the silo 100 and to provide air and agitation thereto. In return, the skid 200 may receive the chemical 107 from the silo 100, and may detect the type of chemical and the weight of the chemical 107 available, and may control the amount and the feed rate of the chemical 107 from the silo 100.

For example, the skid 200 may include a base 201, which may be configured to receive the chemical 107 from the silo 100 and convey the chemical 107 along a discharge path 202. The discharge path 202 may be formed as a powder discharge conduit (e.g., a pneumatic conduit) 203 extending partially within the base 201, as shown. Guide walls 211 may extend upward from the base 201, so as to facilitate lowering the silo 100 at a predetermined location onto the skid 200.

The skid 200 may also include a buffer box 204, which may be in communication with the discharge path 202. In an embodiment, the buffer box 204 may have a tapered shape (e.g., conical or triangular prism) lower section that channels the chemical 107 toward the discharge path 202 by gravity. The skid 200 may also include a receiver 205, above the buffer box 204, into which the discharge port 138 may be received when the silo 100 is lowered onto the skid 200. The receiver 205 may seal with the discharge port 138, e.g., by provision of a seal 207.

Communication between the buffer box 204 and the discharge path 202 may be controlled by one or more transfer valves. For example, a first valve 206 may be located at the bottom of the buffer box 204. A second valve 208 may be disposed between the discharge port 138 and the buffer box 204, e.g. below the receiver 205, so as to control chemical 107 feed from the silo 100 into the buffer box 204. The rate at which the chemical 107 is fed to the discharge path 202 may thus be controlled using the valves 206, 208. When the second valve 208 is opened, a dose of chemical is loaded into the buffer box 204, and thereafter the second valve 208 is closed. The first valve 206 may then be opened to release the dose of chemical 107 from the buffer box 204 into the discharge path 202. As such, the frequency at which new, measured (i.e., the available volume of the buffer box 204) doses are allowed to pass to the discharge path 202 may control the feed rate of the chemical 107. The released chemical in the discharge path 202 may be transported towards the receiving station by air flow (indicated by the arrows in the discharged path 202). Other transfer systems may include conveyor belts, vibratory feeders, etc.

The skid 200 may further include a valve actuator, such as an arm 210, which may be configured to engage and pivot the valve handle 142, so as to open the discharge valve 140 when the silo 100 is lowered onto the skid 200. Accordingly, control of the first and second valves 206, 208 may be employed to control the feed rate of the chemical 107, as explained above, while the discharge valve 140 of the silo 100 is kept open. In other embodiments, the discharge valve 140 may be modulated to at least partially control the feed rate of the chemical 107.

The skid 200 may also include an air delivery system 212 which may cooperate with the air supply system 117 of the silo 100. For example, the air delivery system 212 may include a conduit 214 extending through the base 201. A stabbing connection 216 may extend upwards from the base 201 and may be connected to the conduit 214. An air delivery valve 218 may be positioned between the stabbing connection 216 and the base 201, or elsewhere upstream of the stabbing connection 216 with respect to the air received via the conduit 214. The stabbing connection 216 may be stabbed into the air connection 120 of the air supply system 117 of the silo 100, e.g., when the silo 100 is lowered onto the base 201. Accordingly, air may be supplied to the vessel 106 of the silo 100 from the conduit 214, through the valve 218, through the stabbing connection 216, through the connection 120, through the header 122, and through the nozzles 118.

The skid 200 may also include a stirrer system 220, which will be described in greater detail below, with reference to FIG. 5, according to an embodiment. The stirrer system 220 may include a motor 224 and a stirrer 226 that is driven to rotate by the operation of the motor 224. The motor 224 may be any type of motor, such as an electric motor, hydraulic motor, air motor, or the like. The stirrer 226 may include one or more agitators 228. The agitators 228 may be collapsible, such that ends thereof pivot downwards, toward one another, but may be biased into the illustrated, expanded configuration. Thus, when the silo 100 is lowered onto the base 201, the agitators 228 may be collapsed as the stirrer 226 is stabbed through the port 144. In a specific embodiment, the silo 100 may additionally include bearing(s) 230, which may be housed within the port 144, so as to support rotation of the stirrer 226 within the vessel 106. The bearings 230 may be any suitable type (or combination) of bearings, such as ball bearings, journal bearings, or the like.

The skid 200 may further include one or more silo weight measurement devices. For example, as shown, the weight measurement devices may be provided by load cells 232, 234. The load cells 232, 234 may be supported on the base 201, and the feet 104 of the silo 100 may be received on top of the load cells 232, 234, such that the weight of the silo 100 is transmitted to the base 201 via the load cells 232, 234. The load cells 232, 234 may thus be configured to measure the weight of the silo 100. The weight of the empty silo 100 may be known, and thus the weight of the chemical 107 remaining within the vessel 106 may be determined based on the weight measured by the load cells 232, 234.

The skid 200 may additionally include an identifier reading device 236. The identifier reading device 236 may be coupled to the base 201 by a compliant mount 238. The compliant mount 238 (e.g., including a spring) may extend upwards from the base 201. The identifier reading device 236 may be positioned to be in proximity to, or contact, the identifier 146 when the silo 100 is positioned on the base 201. The compliant mount 238 may allow the identifier reading device 236 to move to accommodate the lowering of the silo 100 onto the base 201, e.g., so as to avoid damaging either the identifier reading device 236 or the identifier 146.

One or more components of the skid 200 may communicate with a controller 240, which may be or include one or more microprocessors, programmable logic controllers (PLCs), computing devices, etc. For example, the identifier reading device 236 may transmit data to the controller 240 that represents the identification read from the identifier 146. The controller 240 may, for example, access a database of identifications, and may thus receive information related to the contents of the silo 100 based on the identification.

The controller 240 may communicate with valve 218 to provide air to the silo 100. It may also communicate with the load cells 232, 234, in order to determine the amount of chemical 107 remaining in the silo 100. Further, the controller 240 may track the weight over time to determine a feed rate. The controller 240 may communicate with the first and second valves 206, 208 to regulate the feed rate. The controller 240 may also communicate with other controllers, e.g., for other silos/conveyor systems. Further, the controller 240 may receive signals from sensors, other controllers, etc., and adjust the feed rate of the chemical 107 based on the properties of the drilling mud, as will be described in greater detail below.

Figure 3:
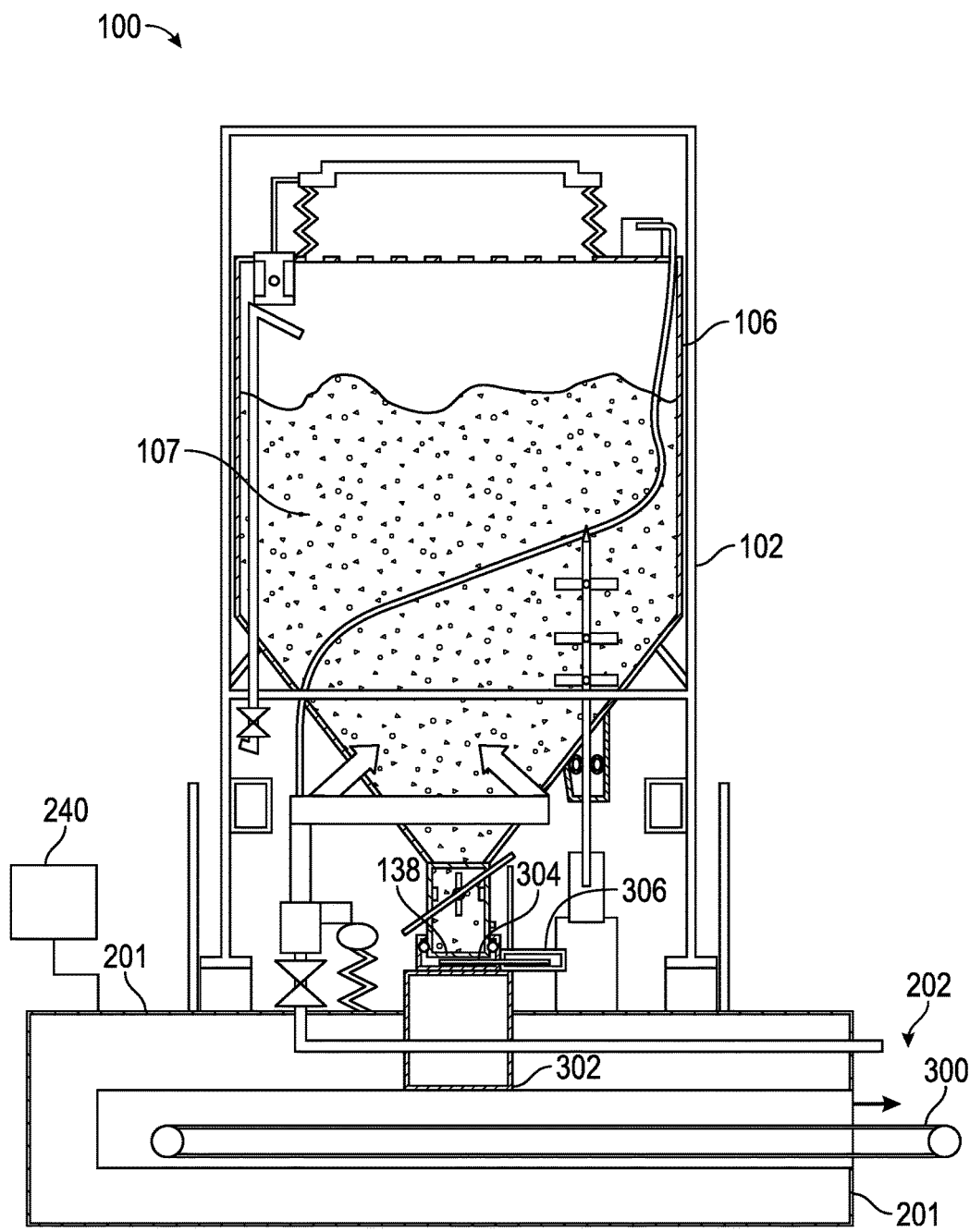
FIG. 3 illustrates a side, schematic view of the silo in a second configuration on the skid, according to an embodiment.

FIG. 3 illustrates a side, schematic view of the silo 100 and the skid 200 in a second configuration, according to an embodiment. In this configuration, the skid 200 may deliver the chemical 107 from the silo 100 to a coarse discharge conduit, e.g., a conveyor 300 (such as a conveyor belt) formed in the discharge path 202. For example, the chemical 107 may be a coarse material, which may not be suitable for conveyance via the powder discharge conduit 203 of FIG. 2. Examples of coarse chemicals include LCM and crushed carbonate, which may have an average particle size of at least about 100 microns. In some cases, the silo 100 may contain fiber (which may be used as LCM to block factures), such as short glass fiber that may have a length of, e.g., up to about 5 mm.

Accordingly, rather than directing the chemical 107 to the buffer box 204, the skid 200 may deliver the chemical 107 to a chute 302, which may direct the chemical 107 to the conveyor 300 in or below the base 201. A transfer valve, such as a gate valve 304 and a gate valve actuator 306, may be provided, e.g., between the receiver 205 and the chute 302. The position of the gate valve 304 may be adjustable to change the open area through which the chemical 107 is fed into the chute 302. As such, the controller 240 may communicate with the actuator 306 to modulate the position of the gate valve 304 and thereby control the feed rate of the chemical 107.

Figure 4:
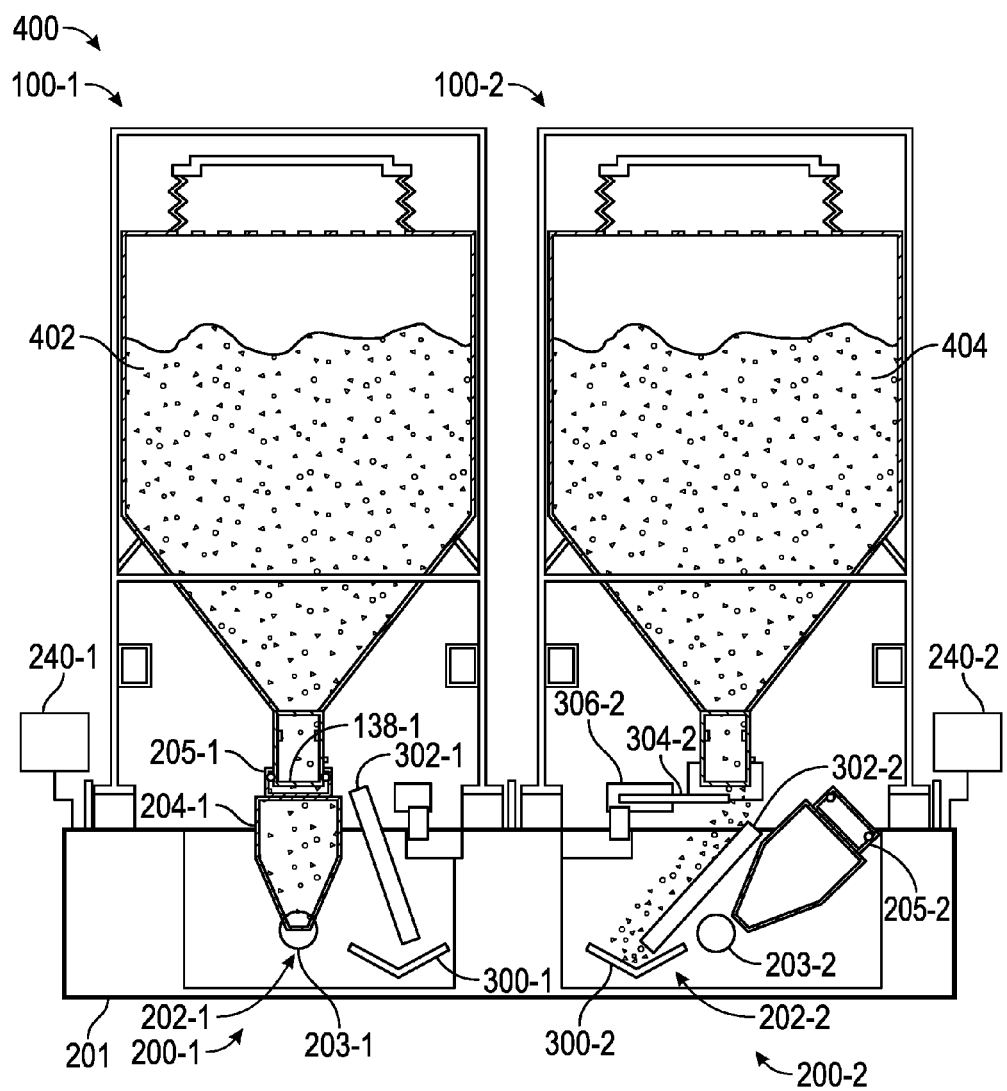
FIG. 4 illustrates a schematic end view of a system of two of the silos received onto the skid, according to an embodiment.

FIG. 4 illustrates a schematic end view of a system 400 of two of the silos 100 (labeled 100-1 and 100-2) received onto the skid 200, according to an embodiment. As shown, the base 201 supports both of the silos 100-1, 100-2, but in other embodiments, two bases 201 may be provided, one for each of the silos 100-1, 100-2. The silos 100-1, 100-2 may contain different types of chemicals. For example, the silo 100-1 may include powdered chemical 402, which may be suitable for fluidification via the air supply system 117 (FIG. 1) and discharge via the buffer box 204 to the powder discharge conduit 203-1. As can be seen, the chute 302-1 of the skid 200-1 is pivoted out of communication with the discharge port 138, such that the chemical 402 is not directed to the conveyor 300-1. The silo 100-1 may thus be in the first configuration, as in FIG. 2.

The silo 100-2 may be in the second configuration, as shown in FIG. 3, such that the skid 200-2 directs coarse chemical 404 from the silo 100-2 connected thereto to the conveyor 300. As can be seen, the buffer box 204-2 is pivoted away from the discharge port 138-2. The chute 302-2 is pivoted to a position below the discharge port 138-2, such that the coarse chemical 404 may be received through the receiver 205 and directed to the conveyor 300. The controllers 240-1, 240-2, which may be provided by a single processor or separately as one or more processors for each, may be employed to regulate the feed rate of the chemicals 402, 404 into the respective discharge paths 202-1, 202-2.

The controller 240 may control which of the chute 302 or buffer box 204 is positioned below the discharge port 138, and thus to which of the conveyor 300 or powder discharge conduit 203 the chemical received through the discharge port 138 is delivered. The controller 240 may make this determination in response to information about the chemical silo 100 configuration received from the identifier reading device 236, which may include information about the type of chemical contained therein.

Figure 5:
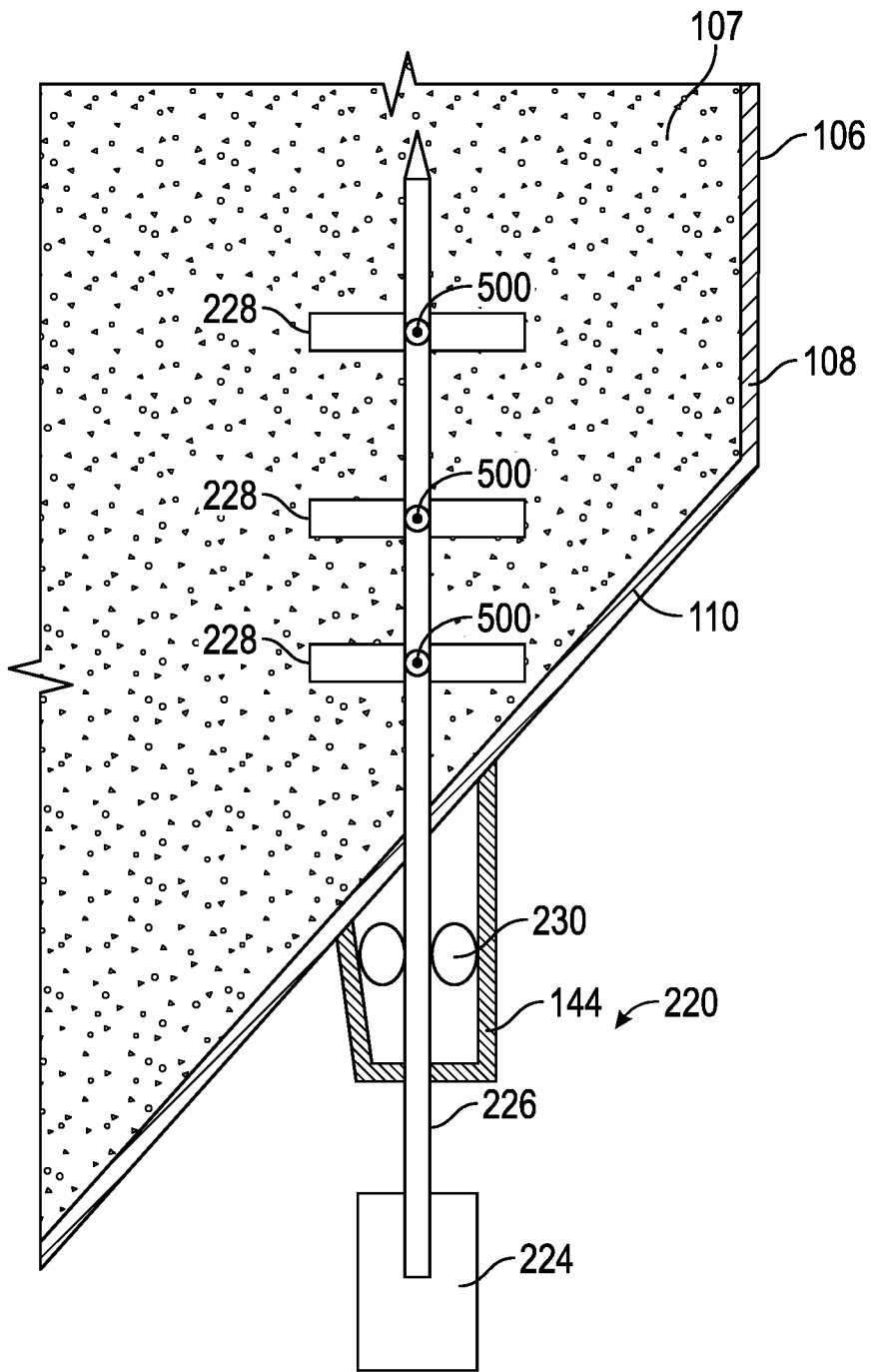
FIG. 5 illustrates an enlarged, schematic view of the stirrer assembly, according to an embodiment.

With additional reference to FIG. 2, FIG. 5 illustrates an enlarged, schematic view of the stirrer system 220, according to an embodiment. The stirrer system 220, as noted above, may include the motor 224, which drives the stirrer 226 to rotate. The stirrer 226, which may be part of the skid 200 (FIG. 2) may pierce the port 144 and extend into the vessel 106 when the silo 100 is received onto the base 201 of the skid 200. Furthermore, the agitators 228 on distal part of the stirrer 226 may be received through the port 144 and into the vessel 106. In order to pass through the port 144, the agitators 228 may be collapsible, e.g., pivotable or flexible inwards. In an embodiment, pivots 500 may be provided in each of the agitators 228, which may enable such collapsing. The pivots 500 may, for example, be spring-loaded, so as to expand the agitators 228 once having passed through the port 144.

In operation, the motor 224 may rotate the stirrer 226, and thereby rotate the agitators 228 in the vessel 106. The bearings 230 may assist in supporting the stirrer 226 in the port 144 during such rotation. Further, the rotation of the stirrer 226 and agitators 228 may assist in moving the chemical 107 (e.g., coarse chemical) toward the discharge port 138 (e.g., FIG. 1) of the silo 100.

Figure 6:
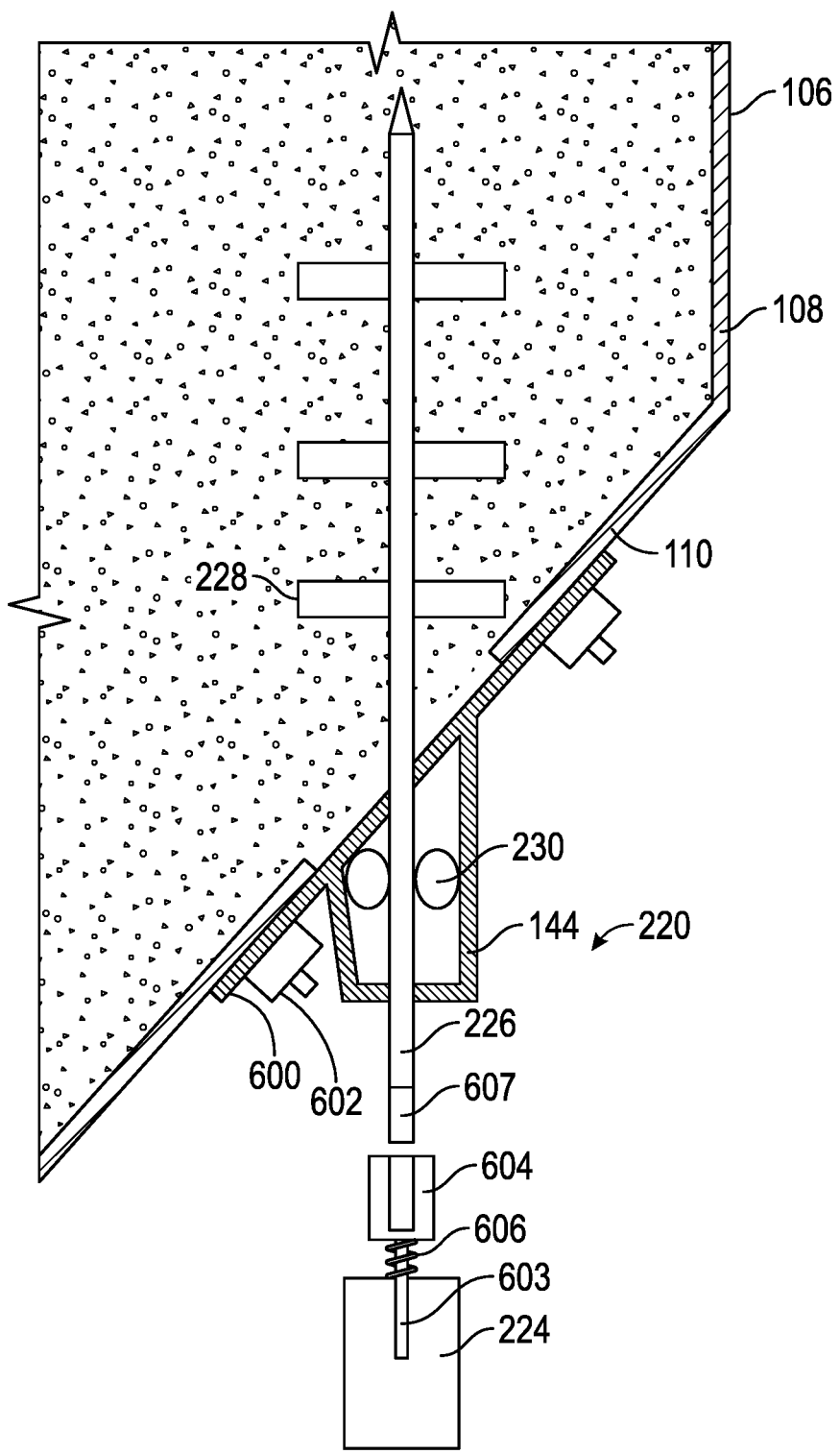
FIG. 6 illustrates an enlarged, schematic view of the stirrer assembly, according to another embodiment.

FIG. 6 illustrates an enlarged, schematic view of the stirrer system 220, according to another embodiment. In this embodiment, the port 144 may include a flange 600, which may be connected to the vessel 106, e.g., at the tapered, lower portion 110. For example, the flange 600 may be coupled to the vessel 106 via one or more bolts 602.

The stirrer 226 and the agitators 228 may be received through the port 144 so as to become part of the silo 100. For example, the stirrer 226 may be received down through the port 144, such that the end opposite to the agitators 228 extends downward from the port 144. In such an embodiment, the agitators 228 may not be collapsible.

The stirrer system 220 may include a shaft 603 that is driven by the motor 224 and a coupling 604, which may be connected to an end of the shaft 603. Additionally, a spring 606 may be received around the shaft 603, between the motor 224 and the coupling 604, e.g., to absorb impact forces incident on the coupling 604. The stirrer 226 may include a coupling end 607. The coupling end 607 may be received into the coupling 604 when the silo 100 is lowered onto the skid 200. The coupling end 607 and the coupling 604 may be may be keyed, or have a polygonal (e.g., hexagonal) mating profiles, so as to transmit rotation from the shaft 603 to the stirrer 226. In some embodiments, the coupling 604 may be integrally formed with the stirrer 226, but in other embodiments, may be a separate piece that is fastened, bonded, welded or otherwise attached to the stirrer 226.

Figure 7A:
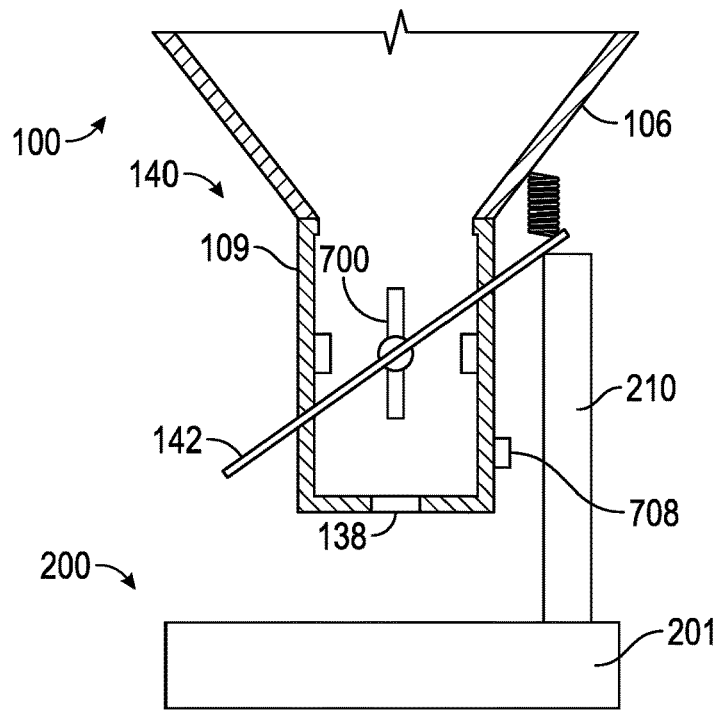
FIGS. 7A and 7B illustrate enlarged, schematic views of the discharge valve of the silo and a portion of the skid, according to an embodiment.
Figure 7B:
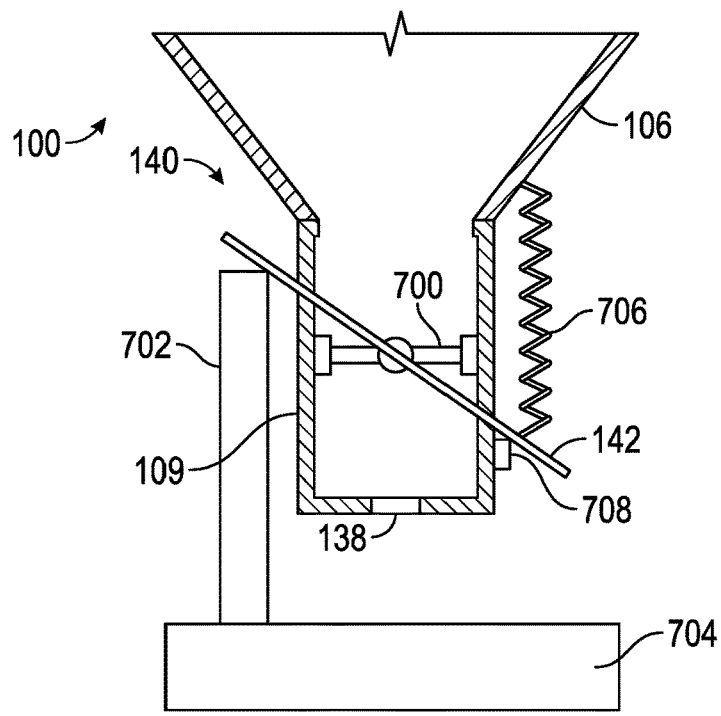

FIGS. 7A and 7B illustrate enlarged, schematic views of the vessel outlet 109 of the silo 100, including the discharge valve 140, and a portion of the skid 200, according to an embodiment. In particular, in FIG. 7A, the discharge valve 140 is open, and in FIG. 7B, the discharge valve 140 is closed. The handle 142 may be held open by interaction with the arm 210, which may extend upwards, e.g., from the base 201 and engage one side of the handle 142. Accordingly, when the silo 100 is lowered onto the skid 200, the arm 210 engages the handle 142, pivoting the handle 142. A valve 700 may be connected to the handle 142 and may pivot along with the handle 142, thereby opening, and maintaining the valve 140 in an open position, which may allow the chemical 107 (FIG. 1) to proceed through the discharge port 138. The biasing member 706 may be compressed (as shown in FIG. 7A) when the valve 700 is open. The biasing member 706 may close the valve 700 when the silo 100 is removed from the skid 200. The block 708 may limit the rotation of the handle 142.

As shown in FIG. 7B, the handle 142 may also be configured to interact with an arm 702 of a transport stand 704. The silo 100 may be positioned on the transport stand 704 prior to and/or after the skid 200. The arm 702 may extend upwards, e.g., to an opposite side of the handle 142, which may force the handle 142 clockwise, as shown, thereby closing the valve 140. The valve 140 may also include a biasing member 706 (e.g., a spring) and a rotation-limiting block 708. The biasing member 706 biases the valve (e.g., by biasing the handle 142) to the closed position. The rotation-limiting block 708 may be positioned to avoid over-rotation of the handle 142 by interaction with the arm 702, so as to maintain the valve in a closed position.

Figure 8A:
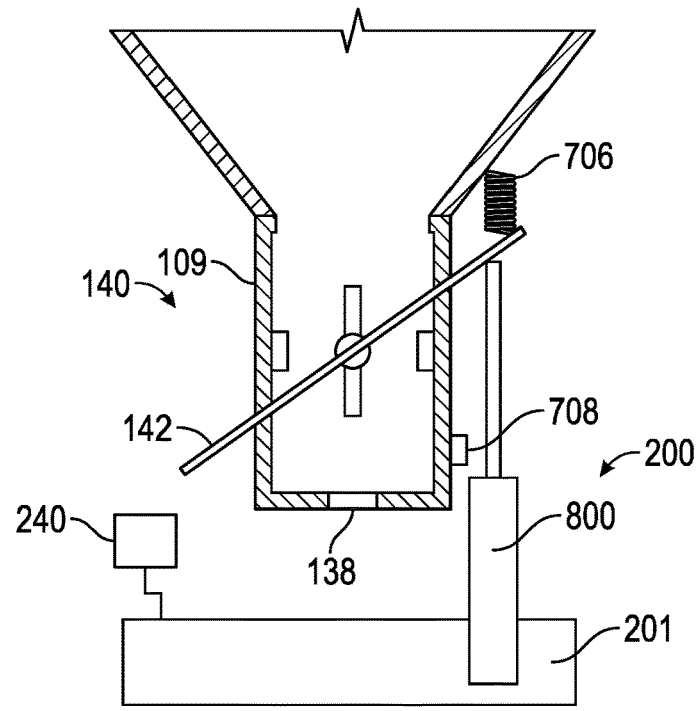
FIGS. 8A and 8B illustrate enlarged, schematic views of the discharge valve of the silo and another embodiment of the skid, according to an embodiment.
Figure 8B:
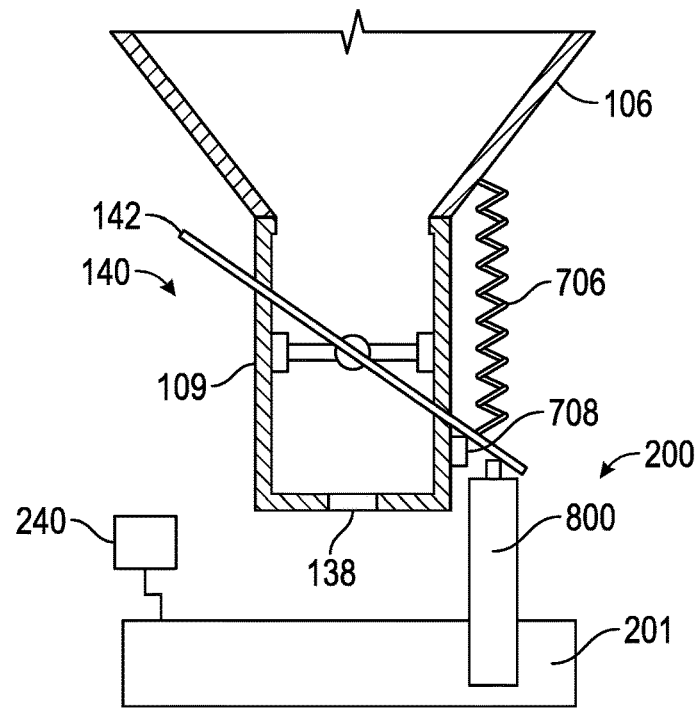

FIGS. 8A and 8B illustrate enlarged, schematic views of the vessel outlet 109 of the silo 100, including the discharge valve 140, and another embodiment of the skid 200, according to an embodiment. In this embodiment, the skid 200 may include a linear valve actuator 800, e.g., in lieu of the arm 702. The linear valve actuator 800 may engage the handle 142 and expand to cause the handle 142 to pivot, and there adjust the position of the valve 700, e.g., between open (FIG. 7A) and closed (FIG. 7B). The biasing member 706 may bias the handle 142 toward the closed position (e.g., downward, as shown) to close the valve 140 when the linear valve actuator 800 retracts. The rotation-limiting block 708 may again prevent over-rotation of the handle 142, and thus ensure a secure closure of the valve 140. In some embodiments, the controller 240 may control the extension and retraction of the valve actuator 800 and thus the position of the valve 140. As such, the controller 240 may adjust the feed rate of the chemical by controlling the actuator 800.

Figure 9:
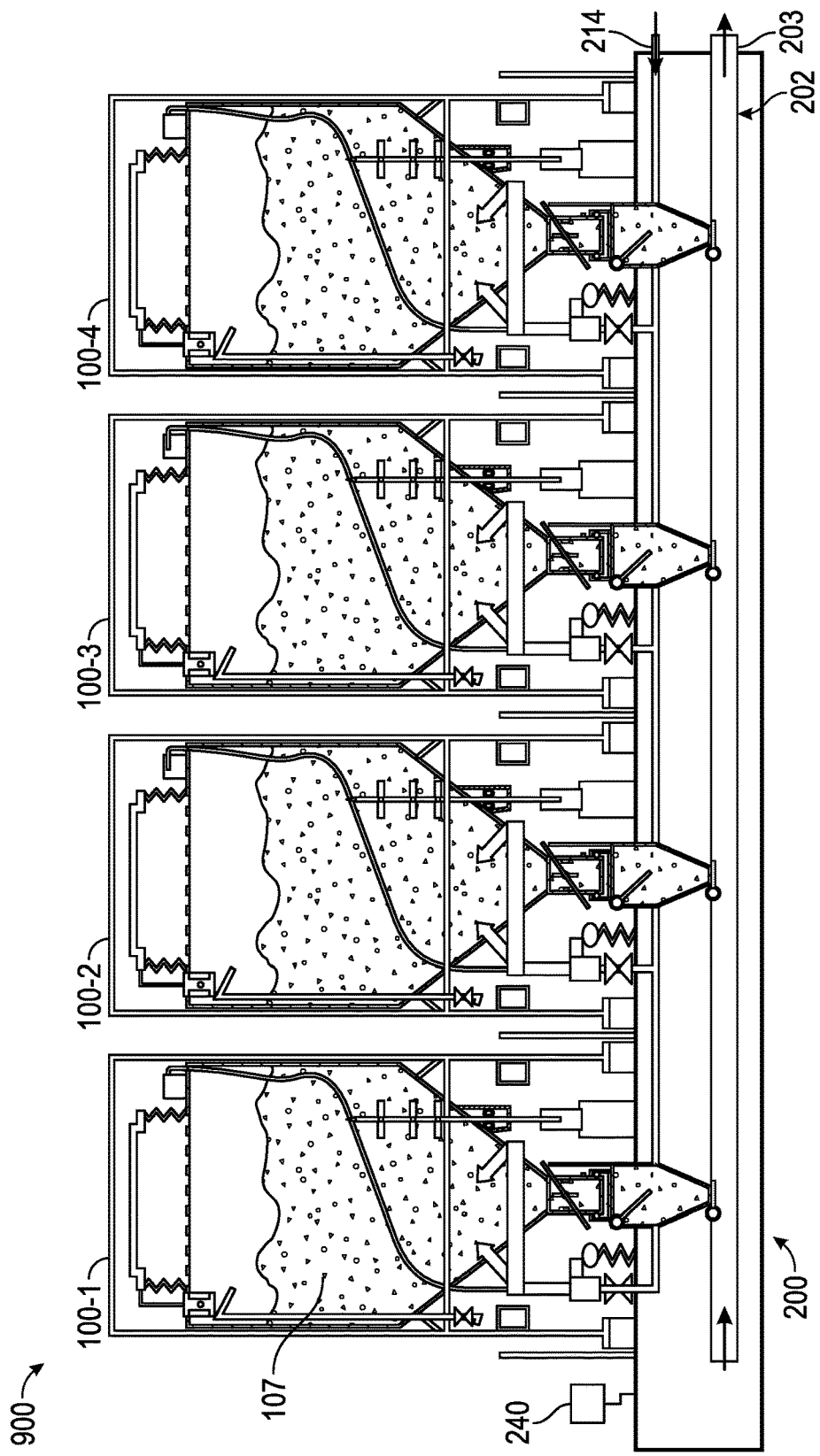
FIG. 9 illustrates a side, schematic view of a chemical delivery system, according to an embodiment.

FIG. 9 illustrates a side, schematic view of a chemical delivery system 900, according to an embodiment. The chemical delivery system 900 may include several (e.g., four, as shown) silos 100-1, 100-2, 100-3, 100-4, which may be aligned next to one another, as shown. The silos 100-1, 100-2, 100-3, 100-4 may each be operable to deliver chemicals 107-1, 107-2, 107-3, 107-4 to a common powder discharge conduit 203, which may form at least a portion of the discharge path 202. The chemicals 107-1, 107-2, 107-3, 107-4 may or may not have the same composition as one another. As shown, each of the chemicals 107-1, 107-2, 107-3, 107-4 is fed to the powder discharge conduit 203, and thus each may be of the fluidized powder type. In some embodiments, however, one or more of the chemicals 107-1, 107-2, 107-3, 107-4 may be of the coarse type and may thus be fed to the conveyor 300 (e.g., FIG. 4). Accordingly, the silos 100-1, 100-2, 100-3, 100-4 may share the skid 200, which may be built or otherwise configurable to accommodate several such silos. The silos 100-1, 100-2, 100-3, 100-4 may also share the air delivery conduit 214. The silos 100-1, 100-2, 100-3, 100-4 may be individually controlled by a single controller 240, or by several controllers (e.g., one for each of the silos 100-1, 100-2, 100-3, 100-4).

Figure 10:
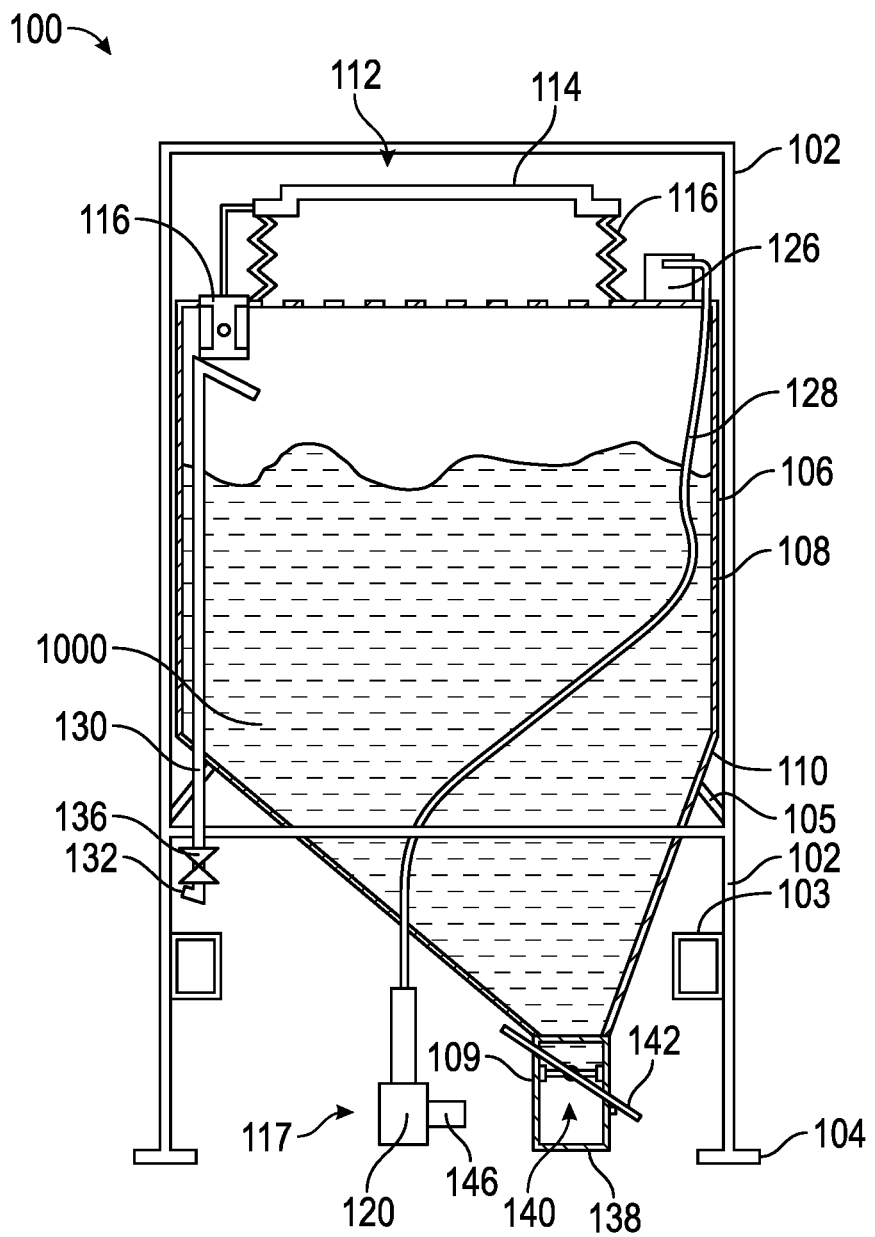
FIG. 10 illustrates a side, schematic view of the silo in a third configuration, according to an embodiment.

FIG. 10 illustrates a side, schematic view of the silo 100 in a third configuration, according to an embodiment. In the third configuration, the silo 100 may be adapted for supplying a liquid type of chemical 1000 to the skid 200, as will be explained in greater detail below. The silo 100 may include a modified vessel 106 in this configuration, which may position the discharge port 138 off to one side, as shown, such that the discharge port 138 in the third configuration is offset from the discharge port 138 in the first and second configurations (e.g., FIGS. 1 and 3, respectively). The modified vessel 106 may include the rectangular prismatic upper portion 108, but the lower portion 110 may be an asymmetric cone or triangular prism, terminating at the discharge port 138 at the offset position.

The silo 100 may further include the expansion system 112 and at least some other structures provided by the silo 100 in the first two configurations (given the same numbers as in the first two configurations). In some embodiments, at least some components may be omitted in the third configuration. For example, with liquid chemical 1000, there may be no powdered chemical to fluidize, and thus the nozzles 118 and header 122 may be omitted from the air supply system 117. However, to efficiently drain the liquid chemical, the air escape valve 126 may be employed to allow entry of air through the top of the vessel 106, and thus the connection 120, the line 128 may be included to open the air escape valve 126. Similarly, in some embodiments of the silo 100 in the third configuration, at least a portion of the stirrer system 220 (e.g., FIG. 2) may be omitted, as there may be no coarse or fibrous chemical to agitate. In other embodiments, any of these auxiliary systems may be retained in the third configuration, e.g., to promote modularity of the silo 100 and ease of reconfiguration thereof.

The silos 100 in the third configuration may deliver the liquid chemical 107 through the discharge port 138, and the flowrate thereof may be controlled via the discharge valve 140. For example, the discharge valve 140 position may be modulated by an actuator, such as the linear actuator 800 (FIGS. 8A and 8B). In turn, this may control the flowrate of the liquid chemical 1000 through the discharge port 138. In some embodiments, the discharge valve 140 may have several positions, so as to offer several different flow-rate selections, but in other embodiments, the discharge valve 140 may have an open and a closed position. In the latter case, the amount of liquid chemical 1000 dispensed over time may be a function of the duration and frequency at which the discharge valve 140 is opened. It will thus be appreciated that the discharge port 138 may be in a different position for each of the different configurations.

Figure 11:
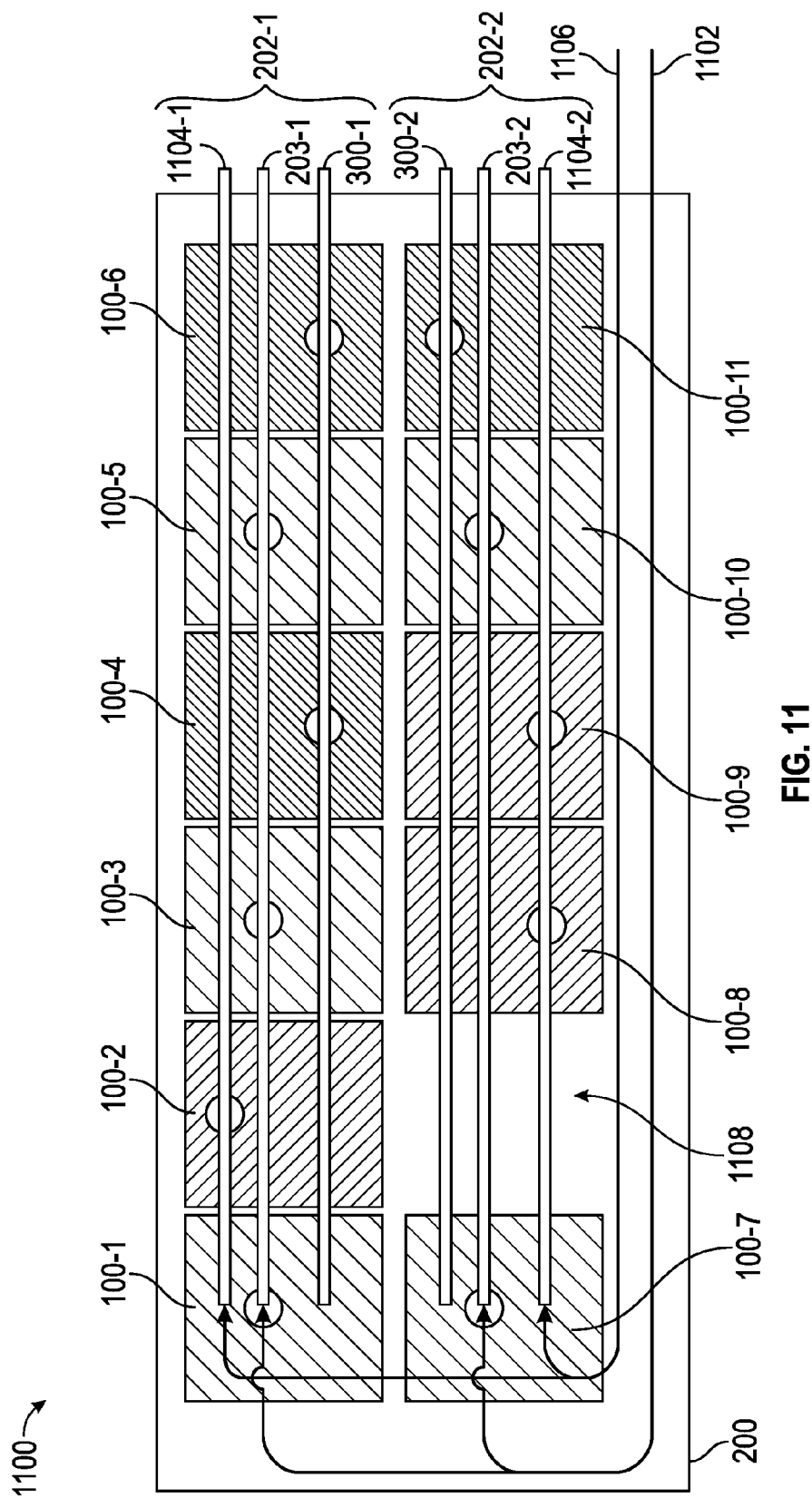
FIG. 11 illustrates a schematic, plan view of a chemical delivery system including the skid and a plurality of the silos, according to an embodiment.

FIG. 11 illustrates a schematic, plan view of a chemical delivery system 1100 including the skid 200 and a plurality of the silos 100 (eleven are shown, individually labeled: 100-1 through 100-11), according to an embodiment. Each of the silos 100 may be in any of the three configurations discussed above, depending on the application. By way of illustration, the silos 100-1, 100-3, 100-5, 100-7, and 100-10 are in the first configuration, and may include a powder chemical. The powder chemical, as described above, may be discharged from the silo 100 and directed to the powder discharge conduit 203; in this embodiment, two pneumatic conduits 203-1, 203-2, are provided, one for each row of the silos 100, although this is merely an example. The pneumatic conduits 203-1, 203-2 may be fed a pressurized air via a pneumatic delivery line 1102. In some embodiments, two or more such delivery lines may be provided.

The silos 100-4, 100-6, and 100-11 may be in the second configuration, and may contain a course or fibrous chemical. The course of fibrous chemical may be discharged to a conveyor 300, as described above. For example, separate conveyors 300-1, 300-2 may be provided by the skid 200, e.g., one for each row of silos 100, as shown. However, in other embodiments, a single conveyor 300 may be provided, or three or more conveyors 300 may be employed.

The silos 100-2 and 100-8 may be in the third configuration, and may contain a liquid chemical. The skid 200 may include one or more liquid discharge conduits (two shown: 1104-1, 1104-2) for receiving the liquid chemical from the silos 100-2, 100-8 in the third configuration. A carrier fluid (e.g., mud, water, hydrocarbon, etc.) may be delivered to the liquid conduits 1104-1, 1104-2 via a carrier fluid delivery line 1106, and at least partially mix with the liquid chemical and move the liquid chemical away from the silo 100.

It will be appreciated that the powder discharge conduit 203, the conveyor 300, and the liquid conduits 1104-1 and 1104-2 may be considered different parts of the same discharge path 202, as shown, or may be considered different discharge paths 202.

The skid 200 may be configured to accept more than the number of silos 100 that are present, e.g., to allow for extensibility of the modular system 1100. Accordingly, in this case, an empty silo position 1108 may be present, and may be at any location in the skid 200.

Figure 12:
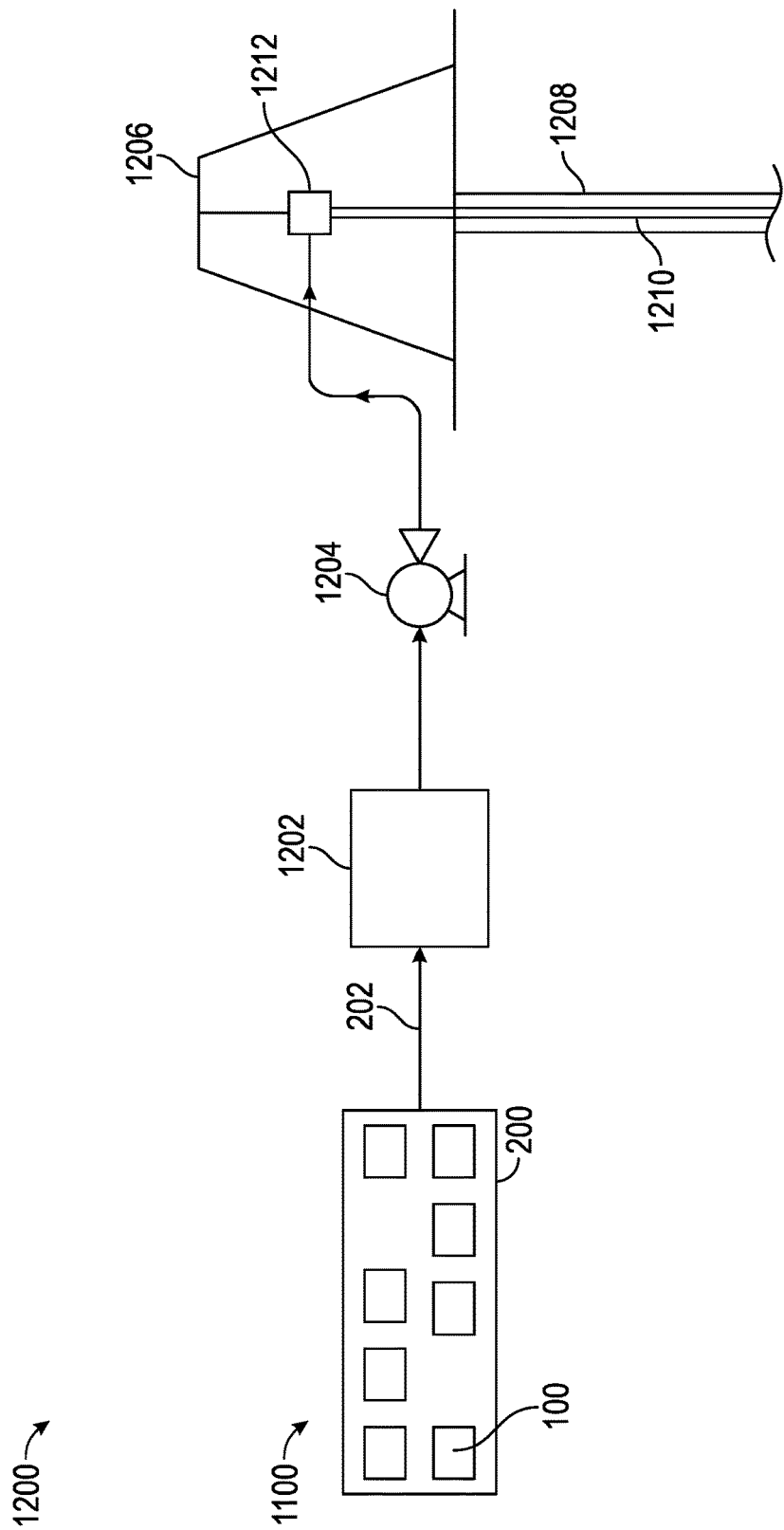
FIG. 12 illustrates a schematic view of a drilling rig system, which includes the chemical delivery system, according to an embodiment.

FIG. 12 illustrates a schematic view of a drilling rig system 1200, which includes the chemical delivery system 1100, according to an embodiment. The drilling rig system 1200 also include a mud mixer 1202, which may receive the chemicals (powdered, dry, and/or liquid) from the chemical delivery system 1100 via the discharge path 202. The mud mixer 1202 may include a jet mixer or another type of mixer, as well as tanks, etc., so as to supply a mixed drilling mud with controlled characteristics to a mud pump 1204. The mud pump 1204 may be a triplex pump, but any other type of pump may be employed.

The mud pump 1204 may deliver the mud to a rig 1206, which may be configured to drill a wellbore 1208 by lowering a drill string 1210 therein. In particular, a drilling device 1212, such as a top drive, may be provided in the rig 1206 and may receive the mud from the pump 1204. The mud may then be delivered through the drilling device 1212 and into the drill string 1210. The mud may circulate through the drill string 1210, and out into the annulus formed between the drill string 1210 and the wellbore 1208. Various other systems, such as managed-pressure drilling systems, mud recovery systems, separators, shakers, sieves, centrifuges, etc., may be employed as part of the rig 1206. Furthermore, although the rig 1206 is illustrated as a land rig, the rig 1206 may be positioned on an offshore platform.

Figure 13:
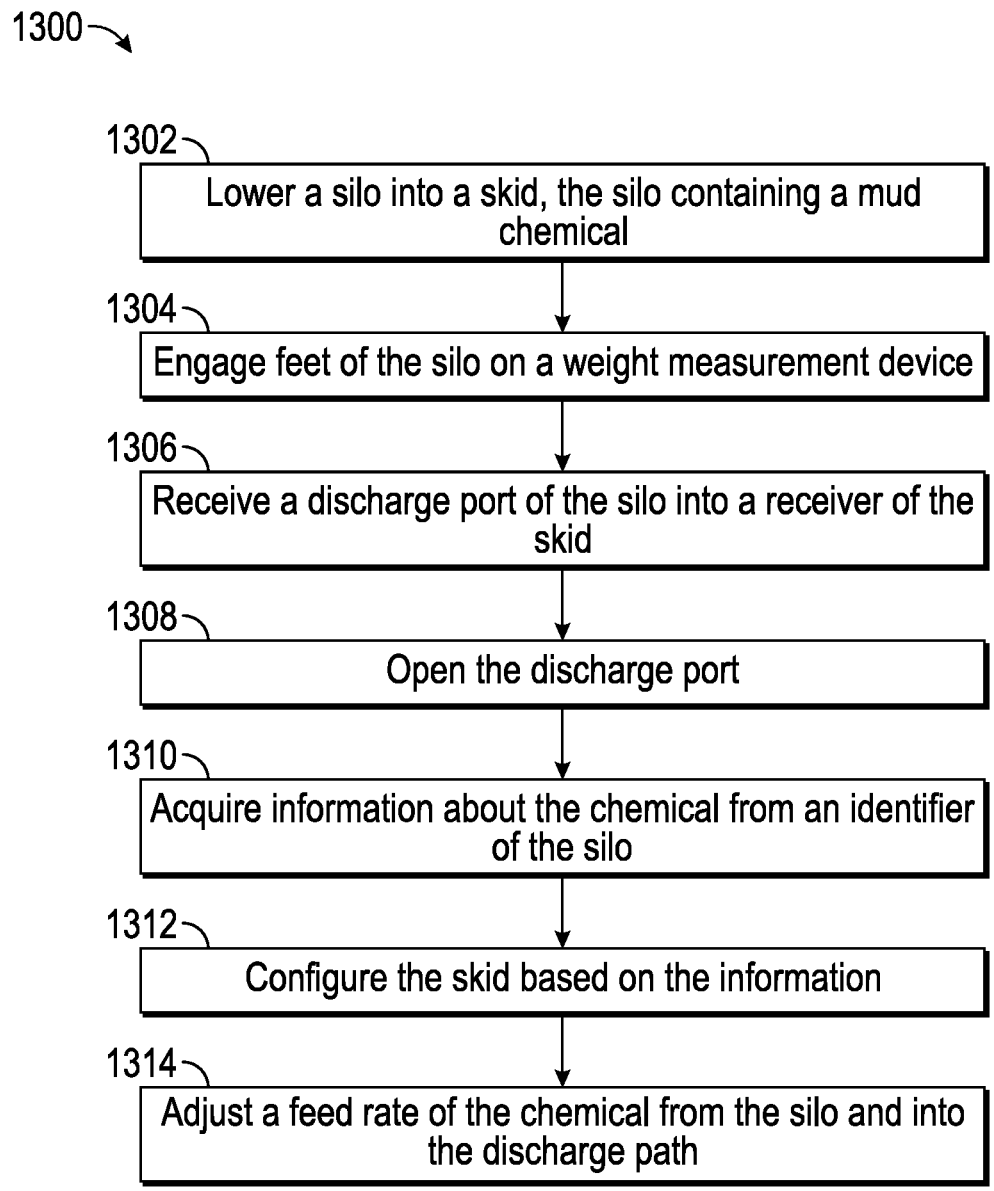
FIG. 13 illustrates a method for delivering a mud chemical to a drilling rig, according to an embodiment.

FIG. 13 illustrates a method 1300 for delivering a mud chemical to a drilling rig, according to an embodiment. The method 1300 may proceed by operation of one or more of the chemical delivery systems 400, 900, 1100 discussed above, but some embodiments may apply equally to other systems.

The method 1300 may include lowering a silo 100 onto a base 201 of a skid 200, as at 1302. It will be appreciated that several such silos 100 may be lowered onto the skid 200, and, further that the silos 100 may be in any of the three configurations, with a discharge port 138 thereof being configured to deliver a different type of chemical to a different discharge path 202 of the skid 200, depending on the configuration.

The method 1300 may also include engaging one or more feet 104 of a frame or housing 102 of the silo 100 with a weight measurement device (e.g., load cells 232, 234), as at 1304. Further, the method 1300 may include receiving the discharge port 138 of the silo 100 into a receiver 205 of the skid 200, as at 1306. The method 1300 may then include opening the discharge port 138 of the silo 100 using an actuator of the skid 200, as at 1308. The actuator may be a linear actuator 800, a stationary arm 210, or any other type of actuator operable to open the discharge port 138. In some embodiments, the actuator may open the discharge valve 140 during, and as caused by, the lowering of the silo 100 onto the base 201.

The method 1300 may also include acquiring information about the chemical 107 in the silo 100 by reading an identifier 146 using a reading device 246, as at 1310. A controller 240 may receive the information and may determine characteristics of the chemical 107 in the silo 100 based on the information. Such information may include the composition of the chemical 107 as well as the form or "type" (powder, coarse, liquid) of the chemical 107.

In response to this information, the controller 240 may select a discharge path 202, or an appropriate part of the discharge path 202, for the chemical 107 received from the silo 100, as at 1312. Such configuration may be based at least in part on the information received from the identifier 146. For example, if the silo 100 is in the first configuration (powdered chemical), the skid 200 may position a buffer box 204 beneath the receiver 205, such that the buffer box 204 directs metered doses of the chemical 107 from the silo 100 to a powder discharge conduit 203. Further, the controller 240 may cause the air deliver system 212 to provide air to the air supply system 117, so as to fluidize the powdered chemical.

If the silo 100 is in the second configuration (coarse chemical), the skid 200 may position a chute 302 beneath the receiver 205, which may direct the coarse chemical to the conveyor 300. The silo 100 may also cause the motor 224 to rotate, thereby agitating the coarse chemical in the silo 100 by rotating the stirrer 226.

If the silo 100 is in the third configuration (liquid chemical), the skid 200 may receive the liquid chemical in the liquid discharge line 1104.

The method 1300 may further include adjusting a feed rate of the chemical into the discharge path 202, as at 1314. The feed rate may be adjusted in several ways, depending at least partially on the configuration of the silo 100. For example, in the first configuration of the silo 100, the feed rate may be adjusted by adjusting the timing of actuators for the first and second valves 206, 208. In the second configuration, the feed rate may be adjusted by adjusting the position of the gate valve actuator 306, and thus adjusting the open flow area allowed by the gate valve 304. In the third configuration, the feed rate may be adjusted using the actuator 800 to modulate the position of the discharge valve 140. In various embodiments, the different techniques for controlling feed rate may be used in any of the configurations. Further, the feed rate may be adjusted based on mud properties seen, e.g., in a mud mixer 1202, with desired mud properties being determined by a variety of factors, e.g., properties of the formation into which the wellbore 1208 extends, etc.

Figure 14:
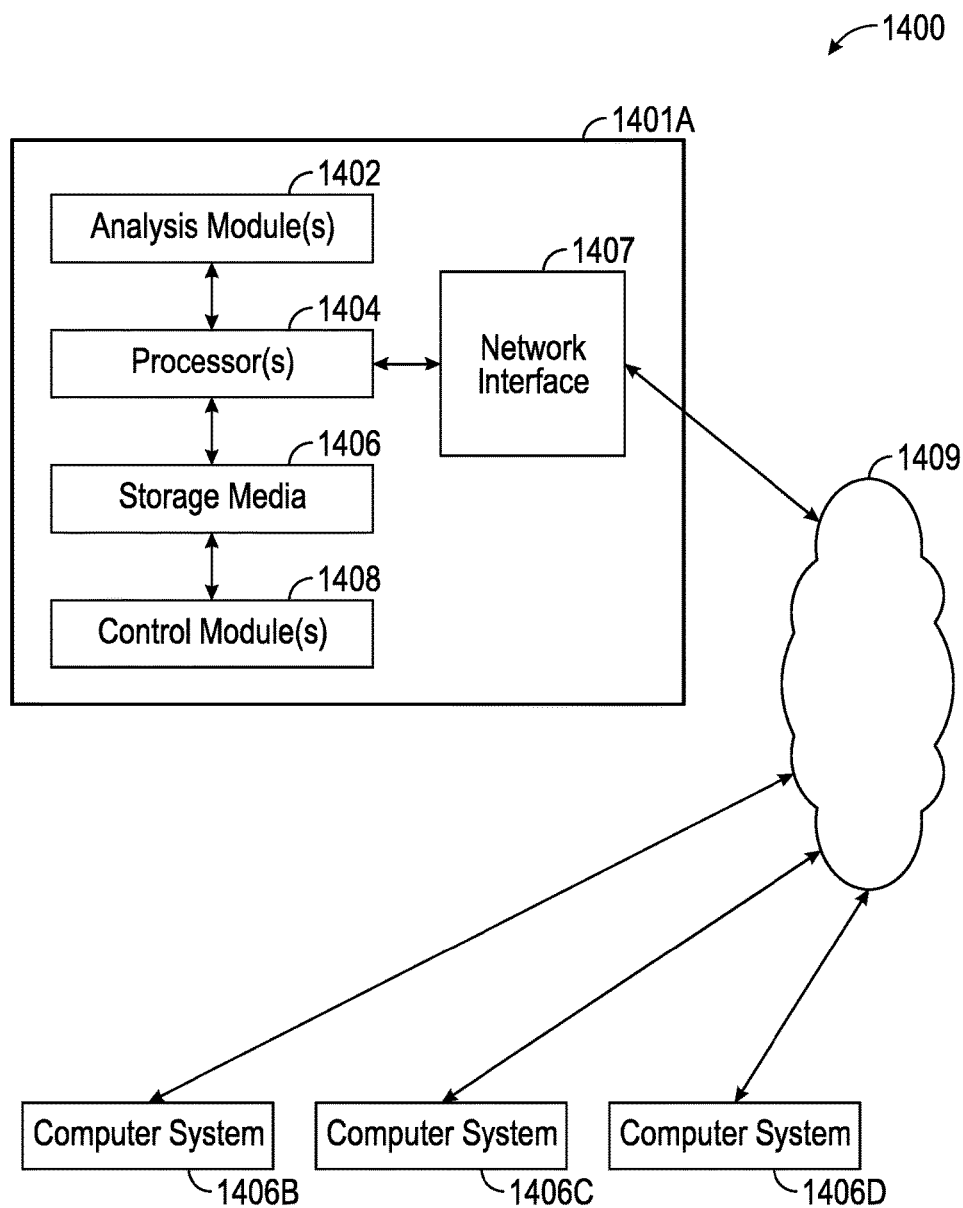
FIG. 14 illustrates a schematic view of a computing system, according to an embodiment.

In some embodiments, the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis modules 1402 that are configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor may include a microprocessor, microcontroller, processor module or subsystem, programmable integrated circuit, programmable gate array, or another control or computing device.

The storage media 1406 may be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLU-RAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, the computing system 1400 contains one or more rig control module(s) 1408. In the example of computing system 1400, computer system 1401A includes the rig control module 1408. In some embodiments, a single rig control module may be used to perform some or all aspects of one or more embodiments of the methods disclosed herein. In alternate embodiments, a plurality of rig control modules may be used to perform some or all aspects of methods herein.

The computing system 1400 is one example of a computing system; in other examples, the computing system 1400 may have more or fewer components than shown, may combine additional components not depicted in the example embodiment of FIG. 14, and/or the computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A silo for a chemical delivery system, comprising:
   a housing; and
   a vessel positioned within the housing and configured to contain a mud chemical, the vessel comprising a discharge port and a discharge valve that controls discharge of the mud chemical through the discharge port, wherein the discharge port is configured to connect to a skid by placing the silo on the skid, and wherein the silo has a plurality of configurations for different types of mud chemicals, wherein the plurality of configurations comprises:
   a first configuration when the mud chemical comprises a powdered chemical;
   a second configuration when the mud chemical comprises a coarse chemical; and
   a third configuration when the mud chemical comprises a liquid chemical.

2. The silo of claim 1, wherein a position of the discharge port is adjustable to deliver chemical to one of a plurality of transfer systems of the skid.

3. The silo of claim 1, further comprising an air delivery system comprising:
   one or more nozzles configured to direct air into the vessel, to fluidize the powdered chemical when the silo is in the first configuration; and
   an air escape valve that allows air to move out of or into the vessel when the air escape valve is opened, wherein the air escape valve is opened in response to a flow of gas being directed to the one or more nozzles.

4. The silo of claim 1, further comprising a mechanical stirrer configured to agitate the coarse chemical in the silo when the silo is in the second configuration.

5. A silo for a chemical delivery system, comprising:
   a housing; and
   a vessel positioned within the housing and configured to contain a mud chemical, the vessel comprising a discharge port and a discharge valve that controls discharge of the mud chemical through the discharge port, wherein the discharge port is configured to connect to a skid by placing the silo on the skid, and
   wherein the silo has a plurality of configurations for different types of mud chemicals, a controller in communication with the discharge valve, wherein the controller is configured to control a rate of transfer of the mud chemical from the silo by modulating the discharge valve.

6. The silo of claim 5, further comprising an identifier configured to be read by a reading device of the skid, the identifier being configured to convey information related to the mud chemical to the reading device.

7. A chemical delivery system for a drilling rig, comprising:
   a silo comprising:
     a housing; and
     a vessel positioned within the housing and containing a mud chemical, the vessel comprising a discharge port and a discharge valve configured to control discharge of the mud chemical through the discharge port, wherein the silo has a plurality of configurations for different types of mud chemicals; and
   a skid comprising:
     a base onto which the silo is received; and
     a discharge path comprising:
       a powder discharge conduit configured to receive a powdered chemical from the discharge port when the silo is in a first configuration of the plurality of configurations;
       a conveyor configured to receive a coarse chemical from the discharge port when the silo is in a second configuration of the plurality of configurations; and
       a liquid discharge conduit configured to receive a liquid chemical from the discharge port when the silo is in a third configuration of the plurality of configurations.

8. The system of claim 7, wherein the skid comprises a buffer box and a chute, the buffer box extending between the receiver and the powder discharge conduit when the silo is in the first configuration, the chute extending between the receiver and the conveyor when the silo is in the second configuration, and the discharge port being offset from the buffer box and the chute when the silo is in the third configuration.

9. The system of claim 8, wherein:
   the silo further comprises an identifier configured to convey information related to the chemical within the vessel;
   the skid further comprises a reader configured to acquire the information related to the chemical within the vessel; and
   the system further comprises a controller in communication with the reader, wherein the controller is configured to adjust the position of the chute and the buffer box in response to the information acquired from the identifier.

10. The system of claim 7, further comprising a controller, wherein the skid comprises one or more transfer valves that control a flow of the mud chemical from the silo to the discharge path, and wherein the controller adjusts the one or more transfer valves to control a mud chemical delivery rate.

11. The system of claim 7, wherein the skid comprises an arm, wherein the arm opens the discharge valve when the silo is lowered onto the base.

12. The system of claim 7, wherein the skid further comprises:
    a mechanical stirrer that is received through a port defined in the vessel of the silo a drive system when the silo is placed on the skid; and
    a motor that drives the mechanical stirrer.

13. The system of claim 7, wherein:
the skid further comprises an air delivery conduit, an air delivery valve connected to the air delivery conduit, and a stabbing connection coupled to the air delivery conduit; and
the silo further comprises an air supply connection and one or more nozzles in communication with the air delivery valve and with the vessel, wherein the stabbing connection is received into the air supply connection when the silo is received onto the base.

14. The system of claim 7, wherein the housing of the silo comprises a foot, and wherein the skid further comprises a load cell upon which the foot is supported, the load cell being configured to measure a weight of the silo.

15. The system of claim 7, further comprising a plurality of silos including the silo, wherein the plurality of silos includes at least one silo in each of the first, second, and third configurations, the plurality of silos being received onto the skid and configured to deliver the mud chemical thereto.

* * * * *